2,950,210

COATING COMPOSITION

Harold D. Schrier, 3405 Winchell Ave., Kalamazoo, Mich.

No Drawing. Filed Dec. 8, 1958, Ser. No. 778,570

2 Claims. (Cl. 106—230)

This invention relates to a coating composition for coating sheets and webs to impart heat sealing properties thereto and also to render the sheet or web non-blocking.

While a variety of different coating compositions have been suggested for imparting heat sealing properties to sheets and webs, these prior coating compositions have not been completely acceptable. In some instances, the ingredients thereof have been too expensive for use in products where low cost of materials is of prime importance. In other instances, the application of the coatings to sheets and webs was a difficult and/or costly operation because special complicated coating techniques or special, costly coating equipment were required. Prior attempts to overcome the aforementioned difficulties have resulted in coating compositions which either did not provide an acceptable heat sealing product or were difficult in use. In particular, it has been observed that many prior heat sealing coating compositions tend to create blocking problems, that is, the coated side of a layer sticks to the uncoated side of the adjacent layer in a roll or in a pile of sheets.

Accordingly, it is an object of this invention to provide an improved composition of coating sheets and webs to impart heat sealing properties thereto.

It is a further object of this invention to provide an improved coating composition, as aforesaid, which utilizes relatively inexpensive ingredients and which may be applied to a sheet or web using conventional machinery and following conventional coating techniques.

It is a further object of this invention to provide an improved coating composition, as aforesaid, which will be non-blocking.

It is a further object of this invention to provide an improved coating composition, as aforesaid, which will provide a high gloss on sheets or webs coated therewith.

Other objects and advantages of the invention will become apparent to those acquainted with compositions of this type upon reading the following detailed description.

The composition to which the invention relates consists essentially of a rosin ester selected from the group consisting of hydrogenated or polymerized rosin esters, preferably glycerol ester of hydrogenated rosin, together with high molecular weight aliphatic amides having alkyl chain lengths of 8 to 18 carbon atoms, the ratio of the weight of said rosin ester to the weight of said amides being between about 5.5:1 and about 12:1. The total weight of said rosin and said amides is at least about 5 percent and preferably about 10 to 15 percent, by weight of the composition. The balance of the composition consists essentially of waxes or polyethylene or mixtures thereof.

The rosin esters are selected from the group consisting of hydrogenated and polymerized rosin esters which are nonoxidizing, which have a softening point similar to the melting point of waxes, which have a light color and which have little or no odor. The preferred rosin ester for the practice of the invention is glycerol ester of hydrogenated rosin having a softening point of 80–88 degrees C., 10 maximum acid number and N maximum rosin scale color, such as Staybelite Ester 10. Satisfactory results are obtained using a modified glycerol ester of hydrogenated rosin having a softening point of 70–80 degrees C., such as Staybelite Ester 101. Polymerized rosin esters having substantially the physical properties set forth above, such as Poly-pale Ester 2, may be used but with less satisfactory results.

The composition also employs high molecular weight aliphatic amides having alkyl chain lengths of 8 to 18 carbon atoms, the amides being derived from fatty acids by replacing the hydroxyl radical of the carboxyl group with an amino group. Amides of the class identified above have melting points ranging from 68–104 degrees C. and are ordinarily commercially available as mixtures of three or more of the members of the class. Suitable amide compositions of the type set forth above are Armid HT and Armid O. It is essential for the purposes of the invention that the ratio of rosin ester to amides be between about 5.5:1 and about 12:1. If the aforesaid ratio is below 5.5:1, the heat sealing properties of the composition are detrimentally affected such that an acceptable heat sealing, coated product cannot be obtained. On the other hand, if the ratio is increased above about 12:1, serious blocking problems occur.

The combined weight of the amides and the rosin ester in the composition must be in excess of about 5 percent of the total weight thereof to provide an acceptable heat sealing product. It is preferred that the combined weight of the amides and rosin esters total between 10 percent and about 15 percent of the total weight of the composition since such provides a product capable of forming a heat seal of the maximum strength and durability. The total weight of the rosin ester and amides can be in excess of 25 percent of the total weight of the composition but such is neither desirable nor necessary since it increases the cost of the composition without a corresponding, if any, increase in the strength and durability of the heat sealing product.

The balance of the composition consists essentially of waxes and/or polyethylene. The waxes employed in the composition may be any suitable, well-known type such as paraffin, carnauba, microcrystalline and semi-microcrystalline wax. The polyethylene must be of the type having a relatively low melting point, e.g., about 215 degrees F. The waxes and polyethylene may be used alone or in any suitable, desired proportions within the scope of the invention.

The coating composition is applied to the sheet as a hot-melt solution, that is, a solution in which the solid materials are reduced to a fluidity suitable for coating machine application by use of heat rather than by use of a solvent. In forming the hot-melt solution, it has been found desirable to melt the heat stable ingredients, such as polyethylene, microcrystalline waxes, etc., and then add the rosin ester. The rosin ester is melted, agitated and mixed therein, the temperature of the melt being maintained at a high level, i.e. at about 275 degrees F., for from about 30 minutes to 8 hours until tests show that it is fully dissolved and mixed with the other ingredients. The amides may be added and mixed in the solution before or after the rosin ester. After the rosin is dissolved and mixed, the ingredients, such as paraffin wax, which are not heat stable for prolonged periods of time at high temperatures, are added and the temperature of the solution is reduced to a level suitable for use on the coating machine, which is usually between about 215–225 degrees F. The hot-melt solution is then ready for immediate use. The hot-melt solution may be applied to the sheet or web using any standard machine adapted for waxing paper and the like following conventional, well-known techniques.

The coating may be applied to webs or sheets made of any suitable material, including paper, cellophane, cloth, metal foil, or the like.

*Example*

Forty pounds of 175 degrees F. melting point, semimicrocrystalline wax, 5 pounds of 11,000 molecular weight polyethylene and 10 pounds of 148 degrees F. melting point microcrystalline wax were melted at a temperature of about 275 degrees F. Twelve pounds of glycerol ester of hydrogenated rosin were added to the solution and mixed and melted therein, the mixture being agitated and held at a temperature of 275 degrees F. for a period of about 30 minutes until visual tests showed that the rosin was completely dissolved and mixed in the solution. One pound of high molecular weight aliphatic amides having alkyl chain lengths of 8 to 18 carbon atoms was added to the mixture and melted therein. Thereafter, 45 pounds of 140–142 degrees F. melting point paraffin wax were added to the solution and the temperature of the solution was reduced to about 215 degrees F. The solution was then transferred to a coating machine and was applied to a paper web in the manner customary for applying hot-melt solution to a paper web, the application temperature range being between about 218 to 225 degrees F.

Labels formed from the coated web were heat sealed to a bread wrapper and it was found that the label could not be removed therefrom without tearing the label. The labels had a substantially increased gloss when compared with labels coated with conventional coating compositions. Labels formed from a web coated by a similar solution, but not including rosin, were found to be unacceptable for heat sealing purposes.

Strips, taken from a web coated with the above-described solution containing amides, were overlapped and pressed together under a pressure of 250 p.s.i. at a temperature of 95 degrees F. for 36 hours. The strips readily separated, showing no blocking. Strips coated with a similar composition, but not containing amides, were tested in similar fashion and were found to adhere to each other quite strongly such that they could not be readily separated.

While a particular preferred embodiment of the invention has been described above, the invention contemplates such changes or modifications therein as lie within the scope of the appended claims.

I claim:

1. A coating composition for sheets or webs, consisting essentially of an ester selected from the group consisting of hydrogenated and polymerized rosin esters which are nonoxidizing and which have a softening point similar to the melting point of waxes, high molecular weight aliphatic amides having alkyl chain lengths of 8 to 18 carbon atoms, the ratio of the weight of said ester to the weight of said amides being between about 5.5:1 and about 12:1, the total weight of said ester and said amides combined being at least about 5 percent by weight of the composition, the remainder of said composition consisting essentially of a material selected from the group consisting of waxes and polyethylene having a relatively low melting point and mixtures thereof.

2. A coating composition for sheets or webs, consisting essentially of glycerol ester of hydrogenated rosin which is nonoxidizing and has a softening point similar to the melting point of waxes and has a light color and little or no odor, high molecular weight aliphatic amides having alkyl chain lengths of 8 to 18 carbon atoms, the ratio of the weight of said ester to the weight of said amides being between about 5.5:1 and about 12:1, the total weight of said ester and said amides combined being between about 10 and about 15 percent by weight of the composition, the remainder of said composition consisting essentially of a material selected from the group consisting of waxes and polyethylene having a relatively low melting point and mixtures thereof.

References Cited in the file of this patent

UNITED STATES PATENTS

| | | |
|---|---|---|
| 2,079,379 | Mitchell | May 4, 1937 |
| 2,371,473 | Sanford | Mar. 13, 1945 |
| 2,532,699 | Coste | Dec. 5, 1950 |
| 2,641,551 | Smith et al. | June 9, 1953 |
| 2,752,263 | Pierce | June 26, 1956 |
| 2,764,509 | Ritson et al. | Sept. 25, 1956 |
| 2,864,716 | Schmalz | Dec. 16, 1958 |